Feb. 14, 1961  W. POPANDOPULO  2,971,316
GUIDING ATTACHMENT FOR AGRICULTURAL IMPLEMENTS
Filed Dec. 22, 1958

INVENTOR:
Wsewolod Popandopulo
BY
AGENT.

United States Patent Office 2,971,316
Patented Feb. 14, 1961

2,971,316

GUIDING ATTACHMENT FOR AGRICULTURAL IMPLEMENTS

Wsewolod Popandopulo, Weimar, Germany, assignor to VEB Mähdrescherwerk Weimar, Weimar, Germany, a corporation of Germany Filed Dec. 22, 1958, Ser. No. 782,068

8 Claims. (Cl. 56—208)

My present invention relates to agricultural machinery, more particularly to machinery of the reaper type such as harvesters, mowers and combines, in which a cutting implement is to be guided at a certain distance above the ground.

The object of my present invention is to provide an attachment for mechanically guiding the cutting unit of a reaping machine along the ground in such manner as to insure a substantially uniform cutting of the stalks to be harvested without substantial encumbrance of the machine or its tractor.

In accordance with this invention I provide, at the forward end of a reaper and underneath the cutting unit thereof, a runner whose rear end is pivotally attached to the machine at a point low above the ground and whose preferably curved front end bears upon the terrain at a location advantageously just ahead of the usual horizontal cutter bar. The cutting unit, which is pivotally mounted on a tractor or other vehicular carrier so as to be swingable about a horizontal axis, is supported partly by a resilient brace independent of the runner and partly by the runner itself, the latter thus carrying only a fraction of the weight of this unit. In a preferred embodiment, a low fulcrum for the runner is provided by loosely attaching a depending arm to a front axle of the associated tractor and anchoring the resilient brace to that arm so as to hold the arm in position while the axle rotates.

In order to insure the necessary relative mobility to the cutting unit and the runner, the former may rest on the latter through the intermediary of a roller or may be coupled with it through a link allowing limited relative displacement.

The invention will be described in greater detail with reference to the accompanying drawing in which.

Figure 1:
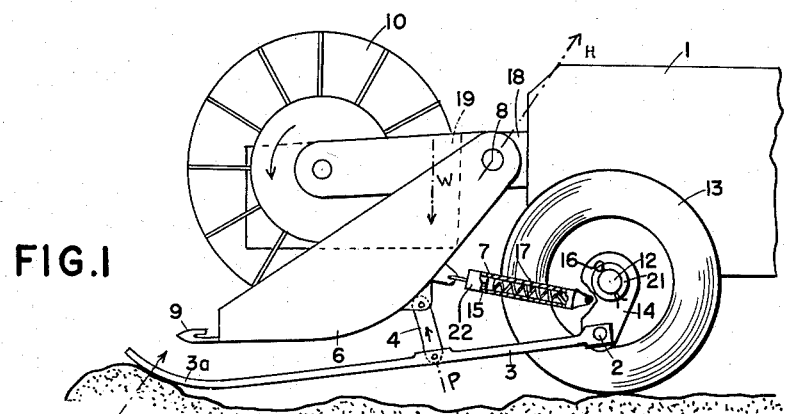
Fig. 1 is a side-elevational, partly sectional view (with parts broken away) of the forward portion of a harvesting machine equipped with an attachment according to the invention.
Figure 2:
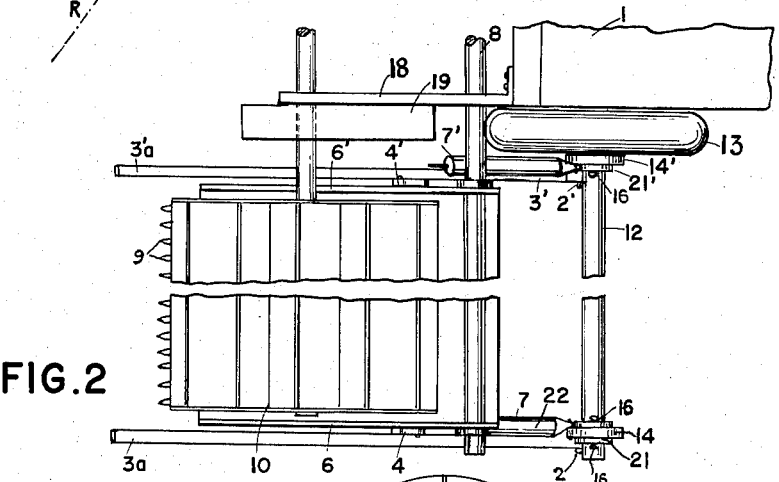
Fig. 2 is a fragmentary top plan view of the assembly shown in Fig. 1.

In Figs. 1 and 2 I have shown a harvesting machine comprising a tractor 1 having a mowing unit 6 attached thereto. The axle 12 of a front wheel 13 of the tractor carries a pair of depending arms 14, 14' which are held in place thereon, with freedom of relative rotation, by washers 21, 21' and cotter pins 16. A pin 2 or 2', projecting from arm 14 or 14', forms a pivot for a runner 3 or 3' whose curved forward end 3a or 3'a rides the terrain underneath and somewhat ahead of cutter bar 9. The mowing unit 6, which bears upon the runners 3, 3' through links 4, 4' and upon the arms 14 through the intermediary of braces 7, 7', comprises the usual gathering reel 10 which engages the oncoming stalks and bends them against the cutter bar 9 so that the cuttings are deposited on a suitable conveyor (not shown). Unit 6 is swingably linked to the body of tractor 1 by means of a shaft 8 which is carried by brackets 18 (only one shown) on the tractor and supports part of the driving mechanism (not shown) for the reel 10 within a housing 19. Each of the braces 7, 7' comprises a cylindrical housing 22, anchored to the arm 14 or 14', in which a piston 15, attached to the unit 6, is slidable; piston 15 is under pressure from an expanding spring 17 within the cylinder.

Figure 3:
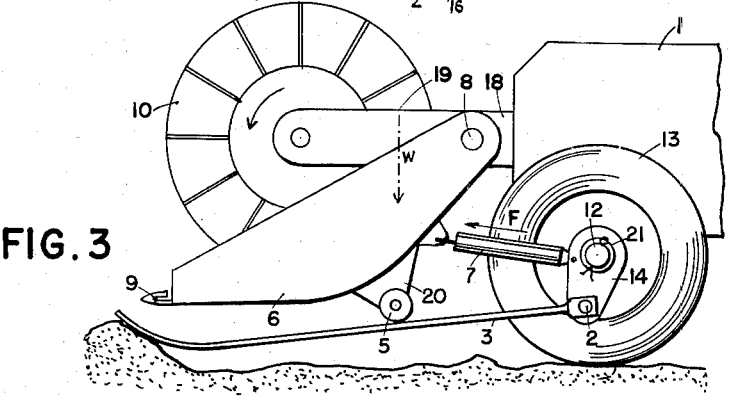
Fig. 3 is a view similar to Fig. 1, showing a modification.

In Fig. 3 a similar attachment is shown wherein, however, the link 4 has been replaced by a supporting roller 5 journaled on a bracket 20 on the underside of unit 6.

As illustrated in Fig. 1, the resilient brace 7 exerts upon the unit 6 a nearly horizontal force F which gives rise to a generally upward pressure P, acting upon the support 4 or 5, and to a rearwardly and upwardly sloping holding force H at the point of attachment 8. A surface irregularity encountered by the forward end of the runner 3 results in a reaction force R having the same general direction as force H. The weight of unit 6 has been indicated by the arrow W passing, as does the vector H, through the center of gravity of the unit.

Figure 4:
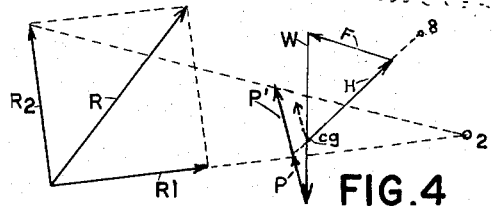
Fig. 4 is a diagram illustrating the distribution of forces in a system according to the invention.

The relationship of the various forces referred to is illustrated in the diagram of Fig. 4. The ground reaction R is split into a nearly horizontal component $R_1$, pointing toward pivot 2, and a component $R_2$ perpendicular thereto. Owing to the low positioning of the pivot above ground, component $R_2$ is relatively large. The polygon of forces F, H, W, P, which has been simplified by the assumption that the center of gravity $cg$ is located directly above the points where unit 6 rests on the runners 3 and 3', shows that the relatively small normal pressure P is augmented by a lifting force P' which is proportional to the reaction component $R_2$. This supplemental lifting force P', which is due to an elevation of the soil at the forward end of the runners, tends to rotate the center of gravity $cg$ of unit 6 about its pivot 8 so as to maintain the correct position of cutter bar 9 above ground.

In practice, the strength F of the compression spring 17 or equivalent resilient brace means may be selected in such proportion to the weight W of the cutting unit that the magnitude of the lift P will range between approximately 10 and 30 kilograms under normal terrain conditions.

The invention is, of course, not limited to the specific embodiment described and illustrated but may be realized in various modifications and adaptations without departing from the spirit and scope of the appended claims.

I claim:

1. In an agricultural machine, in combination, a vehicle, a cutting unit pivotally connected with said vehicle for swinging about a horizontal axis, a longitudinally extending runner having a rear extremity pivoted to said vehicle and freely swingable in a vertical plane, said runner having a forward portion riding on the ground ahead of said vehicle, resilient brace means anchored to said vehicle and to said unit independently of said runner for absorbing part of the weight of said unit, and supporting means on said unit bearing upon said runner at a point intermediate said forward portion and said rear extremity with freedom of at least limited relative motion between said runner and said unit.

2. The combination according to claim 1 wherein said runner is pivoted to said vehicle at a location substantially below the level of said axis.

3. The combination according to claim 2 wherein said vehicle is provided with a front-wheel axle, further comprising a depending arm on said axle rotatable with respect thereto, said brace means being anchored to said arm, said runner being pivoted to said arm.

4. The combination according to claim 1 wherein said supporting means comprises a link articulated onto said runner and said unit.

5. The combination according to claim 1 wherein said supporting means comprises a roller resting on said runner.

6. The combination according to claim 1 wherein said supporting means engages said runner at a location substantially in line with the center of gravity of said unit.

7. The combination according to claim 1 wherein said unit is provided with a horizontal cutter bar, said runner having a curved extremity extending underneath and ahead of said cutter bar.

8. In an agricultural machine, in combination, a vehicle, a cutting unit pivotally connected with said vehicle for swinging about a horizontal axis, a runner pivoted to said vehicle and freely swingable in a vertical plane, said runner having a forward portion riding on the ground ahead of said vehicle, resilient brace means anchored to said vehicle and to said unit independently of said runner for absorbing part of the weight of said unit, and a link articulated onto said runner and said unit in a manner permitting limited relative motion between said runner and said unit.

References Cited in the file of this patent

UNITED STATES PATENTS

| | | |
|---|---|---|
| 2,473,655 | Lohn | June 21, 1949 |
| 2,700,265 | Spieth et al. | Jan. 25, 1955 |
| 2,875,568 | Watamaker | Mar. 3, 1959 |

FOREIGN PATENTS

| | | |
|---|---|---|
| 1,040,493 | France | May 20, 1953 |